(12) United States Patent
Han et al.

(10) Patent No.: US 8,781,687 B2
(45) Date of Patent: Jul. 15, 2014

(54) SECURITY SYSTEM COMPRISING A SELF-MIXING LASER SENSOR AND METHOD OF DRIVING SUCH A SECURITY SYSTEM

(75) Inventors: Meng Han, Aachen (DE); Albrecht Kraus, Kerkrade (NL); Holger Moench, Vaals (NL)

(73) Assignee: Koninklijke Philips N.V., Eindhoven (NL)

( * ) Notice: Subject to any disclaimer, the term of this patent is extended or adjusted under 35 U.S.C. 154(b) by 222 days.

(21) Appl. No.: 12/992,100

(22) PCT Filed: May 7, 2009

(86) PCT No.: PCT/IB2009/051871
§ 371 (c)(1),
(2), (4) Date: Jan. 31, 2011

(87) PCT Pub. No.: WO2009/138912
PCT Pub. Date: Nov. 19, 2009

(65) Prior Publication Data
US 2011/0118943 A1    May 19, 2011

(30) Foreign Application Priority Data

May 16, 2008   (EP) ..................................... 08103986

(51) Int. Cl.
*B60R 21/015*   (2006.01)
*G01P 3/36*   (2006.01)
*B60R 21/00*   (2006.01)

(52) U.S. Cl.
CPC ............... *B60R 21/00* (2013.01); *B60R 21/015* (2013.01); *G01P 3/36* (2013.01)
USPC .................. 701/45; 701/46; 356/28; 280/735

(58) Field of Classification Search
CPC .. B60R 21/00; B60R 21/0136; B60R 21/015; B60R 21/16; G06F 17/00; G01P 3/36
USPC .......................... 701/46, 45; 356/28; 280/735
See application file for complete search history.

(56) References Cited

U.S. PATENT DOCUMENTS

| 4,733,609 A | 3/1988 | Goodwin et al. |
| 5,159,406 A | 10/1992 | Adler et al. |

(Continued)

FOREIGN PATENT DOCUMENTS

| CA | 997044 A1 | 9/1976 |
| DE | 4400680 A1 | 7/1995 |

(Continued)

OTHER PUBLICATIONS

Kibler et al: "Optical Data Links for Automotive Applications"; 2004, Electronic Components and Technology Conference, pp. 1360-1370.

(Continued)

*Primary Examiner* — Thomas Tarcza
*Assistant Examiner* — Tyler J Lee

(57) ABSTRACT

A security system is described, comprising a sensor module (15) which accommodates a laser sensor (10) working with self-mixing interference. The laser sensor (10) generates measurement data which are related to the velocity of an object such as the body of a human being and, optionally, the distance between the laser sensor (10) and the object. Dependent on the measurement data assembled by the laser sensor (10) and supplied to a control circuit (30) such as an airbag computer, the airbag computer activate security means such as an airbag (35) in order to prevent injuries of the human body. Furthermore, a method of driving such a security system is described.

14 Claims, 7 Drawing Sheets

(56) References Cited

U.S. PATENT DOCUMENTS

| | | | |
|---|---|---|---|
| 5,482,314 A * | 1/1996 | Corrado et al. | 280/735 |
| 5,997,033 A | 12/1999 | Gray et al. | |
| 6,087,928 A * | 7/2000 | Kleinberg et al. | 340/436 |
| 6,233,045 B1 * | 5/2001 | Suni et al. | 356/28.5 |
| 6,254,127 B1 * | 7/2001 | Breed et al. | 280/735 |
| 6,407,389 B1 * | 6/2002 | Nishii et al. | 250/338.1 |
| 6,441,363 B1 * | 8/2002 | Cook et al. | 250/221 |
| 6,707,027 B2 | 3/2004 | Liess et al. | |
| 7,202,942 B2 * | 4/2007 | Deines | 356/28.5 |
| 7,526,120 B2 * | 4/2009 | Gokturk et al. | 382/154 |
| 7,911,593 B2 | 3/2011 | Ueno | |
| 2004/0153229 A1 | 8/2004 | Gokturk | |
| 2005/0062955 A1 | 3/2005 | Deines | |
| 2006/0043278 A1 | 3/2006 | Schelp | |
| 2006/0250276 A1 | 11/2006 | Levinson | |
| 2007/0024270 A1 | 2/2007 | Kawamura | |
| 2007/0071056 A1 | 3/2007 | Chen | |
| 2007/0086624 A1 | 4/2007 | Breed et al. | |
| 2007/0164201 A1 | 7/2007 | Liess | |
| 2007/0181810 A1 | 8/2007 | Tan et al. | |
| 2007/0242705 A1 * | 10/2007 | Faure et al. | 372/5 |
| 2008/0114510 A1 | 5/2008 | Wilhelm | |
| 2011/0098893 A1 * | 4/2011 | Hashimoto | 701/46 |

FOREIGN PATENT DOCUMENTS

| | | |
|---|---|---|
| DE | 102004048191 A1 | 4/2006 |
| EP | 1031471 A1 | 8/2000 |
| JP | 2000135965 A | 5/2000 |
| WO | 2006045690 A1 | 5/2006 |
| WO | 2007026293 A2 | 3/2007 |

OTHER PUBLICATIONS

Raoul et al: "A Double-Laser Diode Onboard Sensor for Velocity Measurements"; IEEE Transactions on Intrumentation and Measurement, February 2004. Vol. 53, No. 1, pp. 95-101.

* cited by examiner

SECURITY SYSTEM COMPRISING A SELF-MIXING LASER SENSOR AND METHOD OF DRIVING SUCH A SECURITY SYSTEM

FIELD OF THE INVENTION

The present invention relates to a security system comprising a laser sensor working with self-mixing interference, and a method of driving such a security system.

BACKGROUND OF THE INVENTION

EP1031471 B1 discloses a device for generating a position image of an object or person reflecting or scattering radiation, which device comprises a radiation source for emitting radiation pulses that have such small beam angles that only a small surface area of the object or person is impinged upon by each radiation pulse, at a predefined solid angle, a radiation receiver having a single light-sensitive element and being arranged in a predefined spatial relationship with the radiation source for receiving the parts of the radiation pulses reflected or scattered by the object or person, a control and evaluation device, which controls the radiation source in such a way that the transfer times of the individual radiation pulses can be determined from their emission to their reception and which calculates the position image as a function of the positions of the radiation source and the radiation receiver, the solid angles, at which the respective radiation pulses are sent, and the transfer times. The device is complex and costly.

OBJECT AND SUMMARY OF THE INVENTION

It is an object of the present invention to provide an improved security system and a corresponding method of driving such a security system.

The first object is achieved by means of a security system comprising a sensor module, wherein the sensor module comprises at least one laser sensor working with self-mixing interference, the security system further comprising a control circuit and security means, the sensor module being adapted to generate first measurement data which are directly or indirectly related to at least one first velocity component of an object relative to the sensor module, the control circuit being adapted to receive the first measurement data generated by the sensor module and to activate the security means in dependence upon the first measurement data received from the sensor module as soon as the first measurement data exceeds a defined first threshold value.

The laser sensor may comprise a laser source and a detector. The detector may be a photodiode and the laser source may be a laser diode such as, for example, a side-emitting laser diode, a Vertical Cavity Surface Emitting Laser (VCSEL) or a Vertical Extended Cavity Surface Emitting Laser (VECSEL). The laser source comprises a laser cavity for generating laser light and optionally optical means for collimating and focusing the laser light. The laser light may be emitted and a part of the laser light is either directly reflected by the object, or a movement of the object indirectly causes a reflection of the laser light e.g. due to a pressure wave being generated because of the movement of the object. A part of the directly or indirectly reflected laser light re-enters the laser cavity and causes a modulation of the laser light in the laser cavity. The detector is arranged in such a way that the modulation of the laser beam in the laser cavity can be detected. Dependent on the electrical driving scheme of the laser source, first measurement data regarding the distance or one velocity component of the object can be generated. The measured velocity component is collinear to the direction of the emitted laser light. More details about the self-mixing principle can be found in U.S. Pat. No. 6,707,027 B2, FIGS. 2 to 7 and the related description, in column 1, line 65 to column 2, line 40 and column 2, line 56 to column 3, line 21. One, two, three, four or an array of laser sensors may be used in the security system. If the sensor module comprises more than one laser sensor, the distance between the sensor module and the object is the distance between the laser sensor emitting the laser light used for generating the measurement data, and the object. The first measurement data may be transmitted to the control circuit via a wired or a wireless connection. The control circuit may either be used only for the purpose of the security system or it may be a sub-circuit integrated in a more complex system which is also used for other purposes. In one embodiment, the control circuit may comprise only a high-pass filter and the security means is activated as soon as the measurement data comprises frequency components above a threshold frequency. Alternatively, the control circuit may comprise a calculation unit such as e.g. a processor or the like, and a memory device. In this case, the control circuit may compare the first measurement data with reference data stored in the memory device, and the security means is activated as soon as the first measurement data exceeds a threshold value defined by means of the reference data. The object may be a human body in a vehicle, and the security means may be an airbag integrated in the vehicle, which airbag is activated by movement of the human body. Alternatively, a movement of a part of the vehicle may be detected by the security system and an airbag may be activated. Furthermore, movement of an object not moving with the vehicle may be detected by the security system by means of laser sensors which are directed towards the outside of the vehicle in order to activate the airbag or bags before a crash. In addition or alternatively to the airbags in the vehicle, other security means such as brakes and/or an external airbag may be activated. The security system may also be integrated in robotic systems in order to stop the movement of the robotic system when a barrier is detected or when the movement of the robotic system exceeds defined threshold values. Particularly in cases where the distance to the object is either known or defined by the focus of the laser sensor, the measurement data that are related to one velocity component of the object may be sufficient to determine a critical first measurement data and trigger the activation of the security means. Particularly the focus of the laser sensor, which is determined by the optical elements used for collimating and focusing the laser light, may be used to define a range (focal range) in which the first measurement data can be measured in a reliable way. Outside the focal range, the reflected laser light may be too weak to generate a modulation of the laser light in the laser cavity that can be detected by means of the detector. Since the human eye may be directly or indirectly exposed to the laser light, power is kept well below the maximally permissive exposure (MPE) value. However, if a higher average power is necessary, an eye-safe laser (1.55 µm wavelength) may be applied to prevent any potential photo damage to the human retina.

The security system has the advantage that critical movements of the object are determined in a fast, simple and precise way.

In a further embodiment according to the invention, the control circuit may be adapted to analyze the first measurement data by determining a first velocity component of the object, the first velocity component being collinear to the direction of the emitted laser light at a certain moment in time. This may be done by determining the modulation frequency of the laser light in the laser cavity proportionally to the first velocity component. The direction of the velocity component can be derived in dependence upon the driving scheme of the laser sensor from the modulation pattern as described in e.g. U.S. Pat. No. 6,707,027 B2 column 2, line 56 to column 3, line 21. In addition, the control circuit may be adapted to determine the acceleration component of the object collinear to the emitted laser light by means of the time-dependent variation of the velocity component of the object. The velocity component and, optionally, the acceleration component may be compared with a threshold velocity and, optionally, the threshold acceleration, and the security means is activated as soon as the analyzed measurement data exceeds the threshold velocity and, optionally, the threshold acceleration.

In another embodiment according to the invention, the control circuit is further adapted to determine a first distance between the sensor module and the object.

Measurement data related to the first distance between the sensor module and the object can be generated by changing the driving scheme of the laser sensor. The measurement data related to the first distance is transferred to the control circuit, and the control circuit determines the first distance based on the measurement data and the driving scheme used to generate the measurement data. The sensor module can be subsequently used to generate measurement data related either to the first velocity component or to the first distance by changing the driving scheme of one laser sensor. Alternatively, the sensor module may comprise at least two laser sensors, a first laser sensor generating measurement data related to the first distance and a second laser sensor generating measurement data related to the first velocity component. Furthermore, the control circuit may be arranged in such a way that the first distance and the first velocity component are determined either successively or in parallel, in which case the latter may not necessarily be determined by the number of laser sensors (e.g. a simple but fast control circuit may successively read out laser sensors arranged in an array of laser sensors). The knowledge of the first distance may be used in combination with a first distance threshold value so as to activate the security means only if the first velocity component exceeds the first velocity threshold and the first distance drops below a first distance threshold value. Furthermore, the control circuit may be further adapted to adjust the first velocity threshold value in dependence upon the first distance between the laser sensor and the object. The adaptation of the first velocity threshold value may provide an adaptive security system.

In another embodiment according to the invention, the laser sensor or laser sensors comprised in the sensor module may have a focal region between the laser sensor and the object, and the distance between the focal region and the object should be at least one Rayleigh range. The focal region may be defined by optical elements such as lenses and the like. The security system may detect a movement or a deformation of a part of a surface of the object as soon as the object or the part of the surface of the object passes the focal region. In this case, the detector measures a large burst of the undulated photocurrent signals. By means of the control circuit, the velocity of the object or the deformation speed of the part of the surface of the object can be derived from the frequency of the undulated photocurrent signals. Alternatively, the movement of the object or the deformation of a part of the surface of the object may cause a pressure wave front which is equivalent to a virtually reflective surface. Propagation of the pressure wave front through the focal region of the laser sensor may lead to a burst of the undulated photocurrent signals in the detector. The propagation speed and magnitude of the pressure wave may be correlated with the frequency and amplitude of undulated photocurrent signals, respectively. Dependent on the photocurrent signal measured by the sensor module, the control circuit may activate the security means.

In accordance with a further embodiment of the invention, the sensor module may be adapted to generate at least second measurement data which are directly or indirectly related to at least a second velocity component of the object relative to the sensor module and/or at least a second distance between the sensor module and the object, the control circuit being adapted to activate security means in dependence upon the second measurement data received from the sensor module as soon as the first measurement data exceeds the defined first threshold value and/or the second measurement data exceeds a defined second threshold value. The second velocity component and the second distance may be chosen to be different from the first velocity component and the first distance in order to measure the movement of the object in more than one dimension. Alternatively, the second velocity component and the second distance may be used to introduce a redundancy in the measurement and the subsequent analysis of the measurement data by means of the control circuit. The sensor module may comprise one laser sensor with adaptive optics such as e.g. a moveable mirror in order to generate the second measurement data. Alternatively, the sensor module may comprise a second laser sensor for generating the second measurement data. Furthermore, the sensor module may comprise an array of laser sensors or even two or more arrays of laser sensors. One or more arrays of laser sensors may provide the possibility of cross-checking the measurement results of different laser sensors, which may increase the reliability of the security system. In order to realize this cross-check of the measurement data, the control circuit has to be adapted in a well-known way. Redundancies or even multiple redundancies may be important in certain applications.

In accordance with a further embodiment of the invention, the control circuit may be adapted to determine at least the second velocity component of the object, which control circuit is further adapted to activate the security means as soon as the first velocity component of the object exceeds a predefined first velocity threshold value and the second velocity component exceeds a predefined second velocity threshold value. The knowledge of two different velocity components may provide better knowledge of the movement of the object, and the security means may only be activated if two different first and second velocity threshold values are exceeded. Furthermore, the object may be a soft object comprising different parts which are moveable with respect to each other. Determining only the first velocity component of such a soft object may be insufficient to determine the moment to activate the security means.

In another embodiment of the invention, the security system may comprise at least one object sensor which is adapted to generate object data related to the weight of the object, while the control circuit is adapted to receive the object data and to determine kinematic data of the object based on the combination of the first measurement data generated by the laser sensor and the object data provided by the object sensor, and to activate the security means in dependence upon the kinematic data. The object sensor may be a pressure sensor such as a piezoelectric sensor, a laser sensor adapted to determine e.g. the displacement of a surface caused by the weight of the object, or any other kind of sensor that can be used to generate the object data. Additional information about the weight of the object may be used to adapt the activation of the security means to the real kinematic data of the object, because at least one component of the momentum of the object can be determined by means of the control circuit using e.g. the first velocity component and the measurement data related to the weight of the object.

In a further embodiment of the invention, the control circuit may be an airbag computer, the security means may be at least one airbag and the object may be a human body. Measurement data related to a first velocity component of e.g. a head of a human body may be used to activate the airbag. Second, third, fourth or more measurement data related to velocity components of parts of the human body being measured by means of separate laser sensors or even by means of one or more arrays may be used as described above. Furthermore, the distances with respect to the different parts of the human body may be determined and used as described above. The sensor module may be adapted e.g. to generate first measurement data which are directly related to the first velocity component and the first distance of the head of the human body, the sensor module being further adapted to generate second measurement data which are directly related to a second velocity component of the chest of the human body and a second distance between the laser module and the chest of the human body, while the airbag computer is adapted to determine the first velocity component, the first distance, the second velocity component and the second distance and to activate the at least one airbag as soon as the first velocity component exceeds the first velocity threshold value and/or the second velocity component exceeds a second velocity threshold value. The airbag computer may be further adapted to adjust the first velocity threshold value in dependence upon the first distance and/or to adjust the second velocity threshold value in dependence upon the second distance. In addition, the sensor module may be adapted to generate third measurement data which are directly related to a third velocity component of the head of the human body and a third distance between the sensor module and the head of the human body, and the airbag computer is adapted to determine the third velocity component and the third distance based on the third measurement data received from the sensor module and to activate at least a second airbag as soon as the third velocity component exceeds a third velocity threshold value. The security system may further comprise at least one object sensor which is adapted to generate object data related to the weight of the human body, while the airbag computer is adapted to receive the object data and to determine kinematic data of the human body based on the combination of the first measurement data generated by the laser sensor and the object data provided by the object sensor, and to activate the security means in dependence upon the kinematic data. As described above, additional information about the weight of the human body may be used to adapt the activation of the airbag or airbags to the real kinematic data of the human body, because at least a component of the total momentum of the human body can be determined by means of the airbag computer using e.g. the first velocity component and the object data related to the weight of the human body.

Alternatively or in addition to the object sensor, the security system may further comprise a side-impact sensor module comprising at least one laser sensor working with self-mixing interference and being adapted to generate third measurement data which are related to the velocity of a moving object, the moving object being outside a vehicle in which the security system is mounted, while the airbag computer is adapted to activate the at least one airbag and/or an additional side airbag as soon as the third measurement data exceeds a defined third threshold value. Detecting an object approaching a vehicle in which the security system is mounted prior to a crash may increase the available time to activate the airbag and/or side airbag. Alternatively, the side-impact sensor module may be adapted to generate deformation measurement data which are directly or indirectly related to the deformation of a part of the outer surface of a vehicle, and the airbag computer is adapted to activate the at least one airbag and/or an additional side airbag based on deformation measurement data received from the side-impact sensor module. Particularly a deformation of the door of a car may be detected in a fast and sensitive way, and a side airbag may be activated in order to protect the human body.

In a further embodiment according to the invention, the security system may further comprise an acceleration sensor which is integrated in a vehicle and is adapted to generate acceleration data related to the acceleration of the vehicle, and the airbag computer is adapted to activate the at least one airbag as soon as the first measurement data exceeds the first threshold value and/or the acceleration data exceeds a defined acceleration threshold value. The acceleration sensor may be a Micro Electro Mechanical (MEM) sensor which is able to determine the acceleration of the vehicle such as a car, a motorbike and the like in all three dimensions. Due to the redundancies described above, the combination of several independent sensors may provide a reliable security system.

The second object is achieved by means of a method of driving a security system comprising a sensor module, wherein the sensor module comprises at least one laser sensor working with self-mixing interference, the security system further comprising a control circuit and security means, the laser sensor comprising at least one laser having a laser cavity and at least one detector, and wherein the method comprises the steps of:

generating laser light in the laser cavity,
illuminating an object with the laser light,
reflecting a part of the laser light by the object,
interfering of the reflected laser light and the optical wave in the laser cavity,
sensing the interference of the reflected laser light and the optical wave in the laser cavity by means of the detector,
generating first measurement data which are directly or indirectly related to at least a first velocity component of the object by means of the detector,
receiving the first measurement data by means of the control circuit,
evaluating the received first measurement data with respect to a defined threshold value by means of the control circuit, and
activating the security means as soon as the first measurement data exceeds a defined first threshold value.

Evaluating is herein understood to mean, for example, that the first measurement data is filtered by a high-pass filter and that only high-frequency components above a defined frequency threshold related to a high velocity of the object pass the high-pass filter. Alternatively, the first measurement data may be compared with reference data comprising the first threshold value.

Additional features will be described below, which can be joined or combined with any one of the aspects. Other advantages, particularly over other prior art, will be apparent to those skilled in the art. Numerous variations and modifications can be made without departing from the claims of the present invention. It should therefore be clearly understood that the form of the present invention is illustrative only and is not intended to limit the scope of the present invention.

BRIEF DESCRIPTION OF THE DRAWINGS

The present invention will be explained in greater detail with reference to the Figures, in which the same reference signs indicate similar parts, and in which.

DESCRIPTION OF EMBODIMENTS

Figure 1:
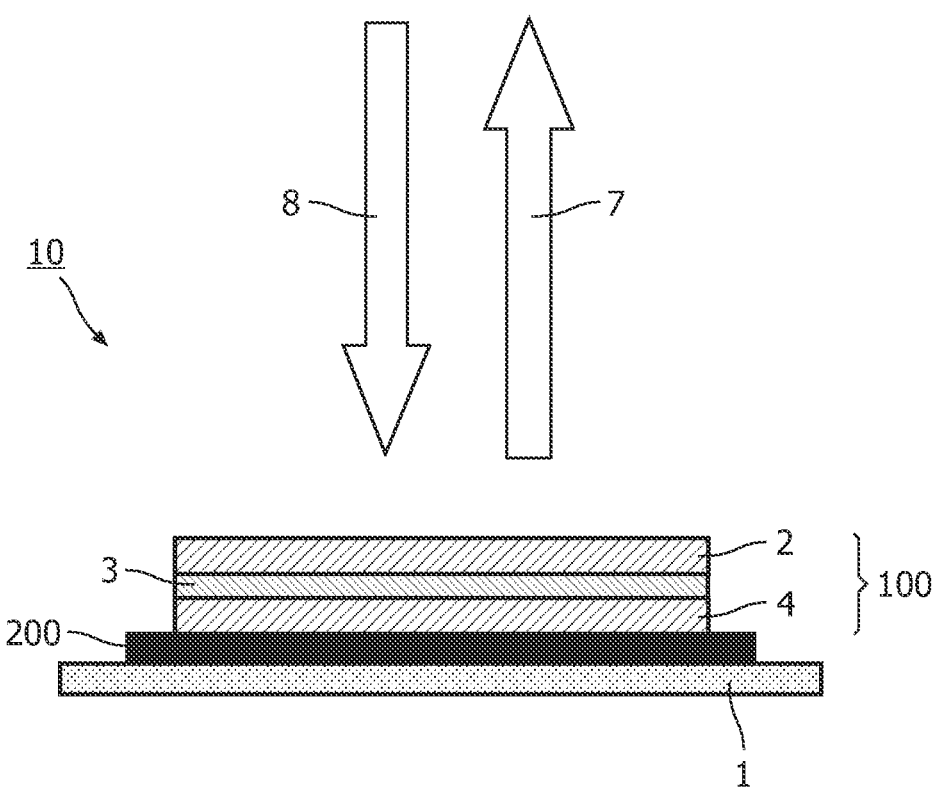
FIG. 1 is a schematic view of a laser sensor comprising a VCSEL and an integrated photodiode.

FIG. 1 shows a VCSEL which may be used as a laser source 100, together with an integrated photodiode which may be used as a detector 200 in a laser sensor 10 according to the present invention. The VCSEL comprises a layer structure and is formed by an electrically pumped gain medium 3 (InGaAs quantum wells embedded in GaAs) embedded between two Distributed Bragg Reflectors (DBR) 2, 4, which form an inner cavity of the laser. One of the DBRs is p-doped and the other is n-doped so as to allow efficient current feeding into the gain region. In this example, the lower DBR 4 is n-doped and the upper DBR 2 is p-doped. Principally, however, doping in the reversed order is also possible. The operating current for current injection into the gain medium 3 is provided by an appropriate power source (not shown) connected to a control unit (not shown) for timely modulating the injection current. A frequency shift of the emitted laser radiation 7 for obtaining the desired distance or velocity information is achieved with this current modulation. A suitable current shape (the driving scheme) is fed into the gain region via the n and p-DBR electric contacts (not shown in the Figure). The detector 200, a photodiode attached to the rear side of the lower DBR 4, measures the small quantity of radiation leaking from the mirror 4 and thus monitors the influence of the backscattered light 8 from the target (not shown in the Figures) on the laser, from which information the distance or velocity of the target object can be extracted. Regarding the velocity, only the velocity component which is collinear to the emitted laser radiation 7 can be determined. The photodiode is grown on an appropriate substrate 1. The further layers of the VCSEL structure are subsequently grown on top of the photodiode. Such a layer structure on this substrate can be produced in a low-cost production process for VCSEL chips. Furthermore, an array of laser sensors may be manufactured in an easy way. In an alternative approach, the VCSEL structure starting with the upper DBR 2 may be grown on top of an optically transparent substrate (dependent on the wavelength of the emitted laser radiation 7). The photodiode is grown on the lower DBR 4 and would therefore be attached to the rear side of such a chip. The laser radiation is emitted through the substrate in this case. Alternatively, the photodiode may be produced independently from the VCSEL and may be combined with the VCSEL in a separate step by e.g. flip-chip bonding, substrate transfer or the like.

As an alternative to a VCSEL, a VECSEL (Vertically Extended Cavity Surface Emitting Laser) may be used. In this case, an external laser mirror (not shown) placed and adjusted above the upper DBR 2 at a suitable distance forms the external cavity. The reflectivity of the upper DBR 2 is reduced in comparison with the VCSEL in order to allow feedback from the external cavity. A Volume Bragg Grating (VBG) having appropriate IR reflection properties can form the external laser mirror, which may be alternatively, for example, a metal or dielectric coated mirror. In contrast to the VCSEL, the gain medium is electrically pumped at a level which does not allow the inner laser cavity system (gain medium 3 sandwiched between DBRs 2 and 4) to exceed the laser threshold, but requires feedback of the external cavity, i.e. the external mirror, to achieve lasing. In this way, the properties of the emitted laser radiation 7 are determined by the external laser cavity rather than by the short inner cavity on the VCSEL chip. Consequently, also the divergence angle of the emitted laser radiation 7 may be decreased and the mode quality may be enhanced as compared with a pure VCSEL-based sensor. The laser may be better focused on a target object such as a road or a wheel, and the feedback 8 (backscattered radiation from the target object) into the laser cavity, which is required for the sensing application, may be improved. As alternatives to VCSELs or VECSELs, edge-emitting lasers may also be used.

Figure 2:
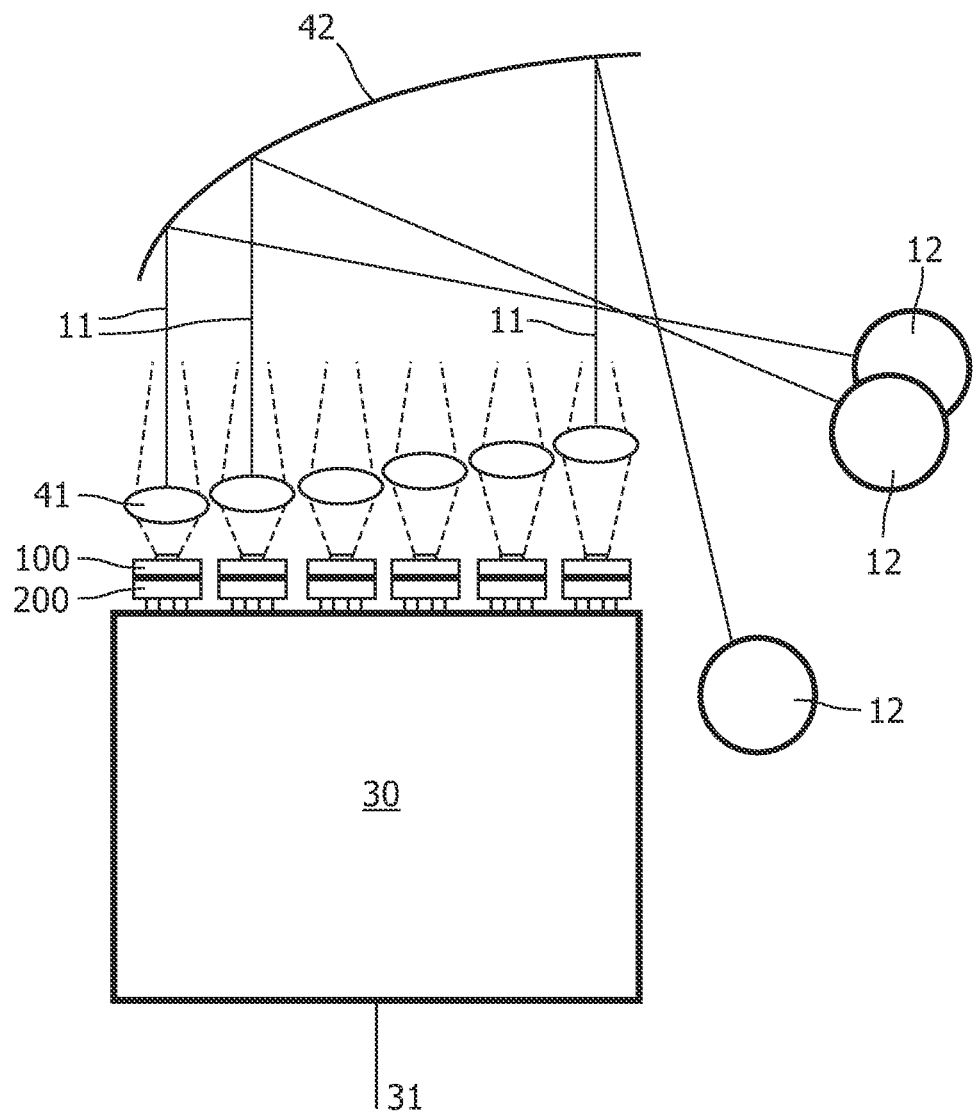
FIG. 2 is a schematic view of an array of laser sensors.

FIG. 2 is a schematic view of a sensor module comprising an array of laser sensors that may be integrated in a security system according to the invention. The sensor module may be mounted to a vehicle (not shown). In this embodiment, an array of laser sources 100 (VCSELs) is combined. Furthermore, optical devices such as micro-lenses 41, as well as a curved mirror 42, are added to each laser source 100. The laser radiation 11 emitted by the laser sources 100 are collimated by the micro-lenses 41 and further focused by the mirror 42 into different focal regions 12. The curvature of the curved mirror 42 is chosen in such a way that the focal regions 12 of laser sources being next to each other overlap so as to get redundancies that can be used to check the reliability of each single laser sensor. Furthermore, a two-dimensional array of laser sources 100 may be used in combination with a curved mirror 42 which is curved in two dimensions in order to increase the number of laser beams with different focal regions 12. The different position of the micro-lenses 41 yields a different distance to the focal regions 12. A different focal length of the individual micro-lens 41 would also do. A human body (not shown) scatters back a quantity of light, which is focused by means of the curved mirror 42 and the micro-lenses 41 into the laser cavity of the laser sources 100. The amount of feedback determines the laser power, which is monitored on the back of the VCSEL with a detector 200, i.e. photodiodes integrated with the laser source 100. The individual signals are amplified and the frequency spectra are analyzed by means of the control circuit 30 connected with the photodiodes. Knowing the laser sensor from which the signal is coming and comparing the different results, it is possible to calculate the velocity component of the different parts of the human body being within the focal regions 12. If one or more velocity components exceed one or more velocity threshold values, e.g. one or more airbags (not shown) are activated via an interface 31. Some of the laser sources of the array may be used to measure the distance to the human body continuously in order to improve the accuracy of the security system by determining the relative position of the human body with respect to the vehicle. Alternatively, the whole array may be subsequently switched between velocity and distance measurements by changing the driving schemes by means of the driving circuit or circuits of the laser sources 100 (not shown). In addition to the activation of the airbag or bags, a steering wheel (not shown) may be moved away from the human body after an activation signal by the control circuit.

Figure 3:
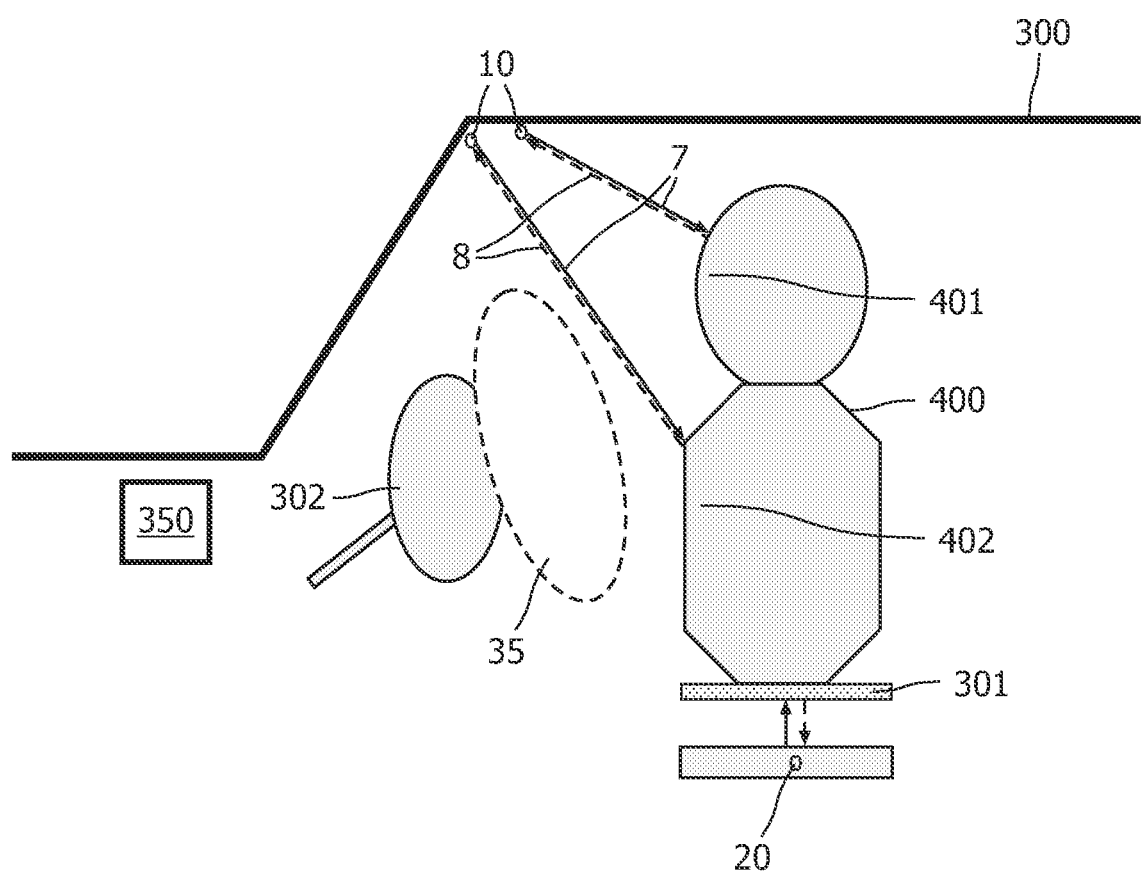
FIG. 3 is a schematic view of a first embodiment of the invention.

In a first embodiment of a security system according to the invention, shown in FIG. 3, the sensor module comprises two laser sensors 10 and a further laser sensor used as object sensor 20. The two laser sensors can be installed in the roof of a vehicle 300 or in the cockpit. Laser light 7 emitted by the first laser sensor is focused on the head region 401 of the human body 400, and laser light 7 of the second laser sensor 10 is focused on the chest region 402 of the human body 400. To measure the vertical displacement of the seat base (sub-micron spatial resolution), which is proportional to the weight of the human being, the object sensor 20 is installed in the seat base 301. The measurement data of the laser sensors and the object sensor are transmitted to an airbag computer 350 (via a wired or wireless connection). Dependent on the measurement data, an airbag 35, which is integrated in the steering wheel 302, is activated by means of an activation signal sent to the airbag (via the wired or wireless connection). In other embodiments, further laser sensors 10 may be integrated in the vehicle body in the front (front, rear collision detection) or on the side of the human body (window/door areas, side collision detection), as well in the back of the seat (second row occupant protection).

Figure 4:
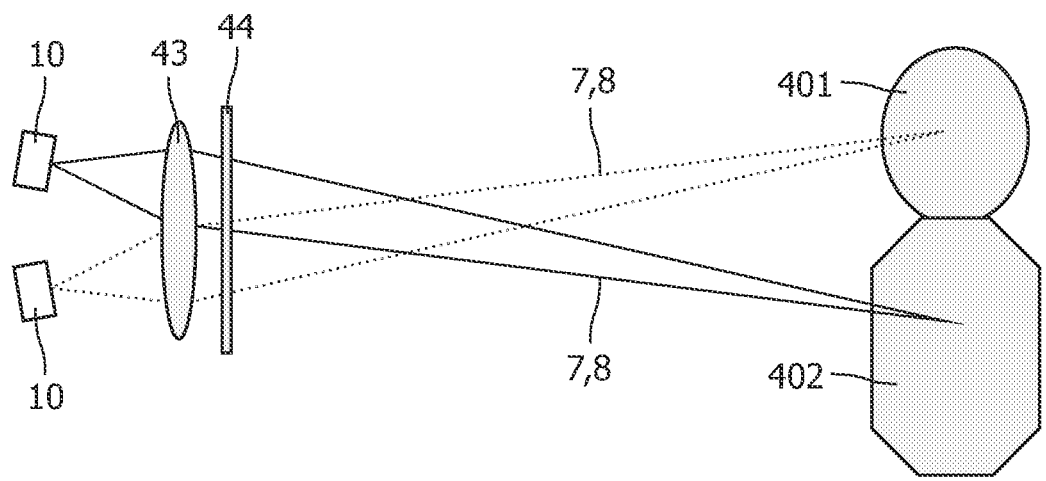
FIG. 4 shows a first optical configuration of a sensor module comprised in a security system in accordance with one embodiment of the invention.

An optical configuration of a sensor module comprised in a security system in accordance with an embodiment of the invention is illustrated in FIG. 4. Laser light from two laser sensors 10 is focused on the target regions by a single optical element 43. A certain tilt angle between the laser sensors ensures that the first laser sensor 10 and the second laser sensor 10 measure the head region 401 and the chest region 402, respectively, of the human body. A flat glass or plastic optical window 44 protects the laser sources from environmental contaminations, but the optical element 43 may be sufficient for this purpose. Due to the tilt angle between the laser light emitted by the first laser sensor 10 and the laser light emitted by the second laser sensor 10, specular reflections from the optical window 44 do not contribute to the self-mixing interference. Optical element 43 should meet at least two requirements. First, laser light from the first laser sensor 10 is approximately collimated or weakly focused on the head region 401, and laser light from the second laser sensor 10 is approximately collimated or weakly focused on the chest region 402. Changes in the actual position of the human body due to either seat setup or collisions will not greatly influence the amplitude of detected self-mixing signals. Secondly, the numerical aperture of optical element 43 should be large enough to collect adequately reflected photons. A large-aperture single optical element 43 is advantageous for high-sensitivity applications.

Figure 5:
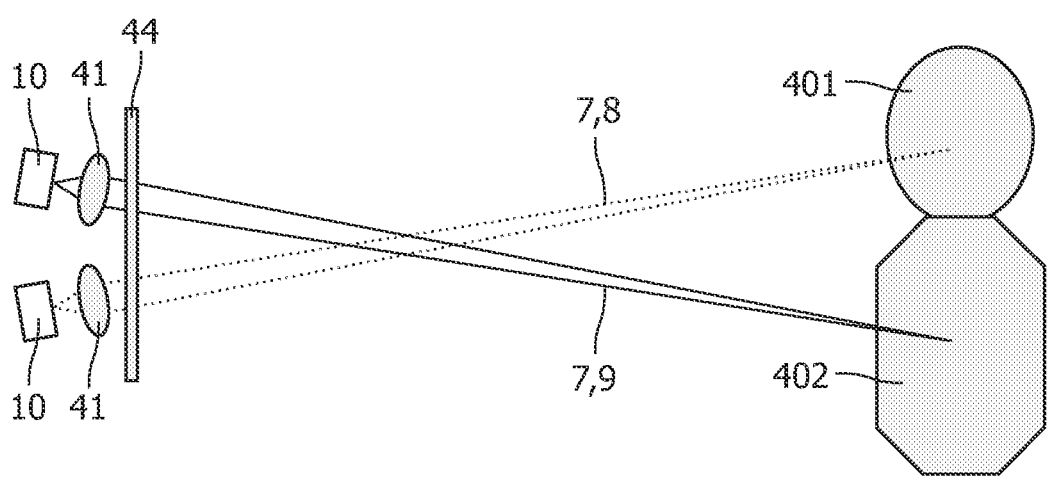
FIG. 5 shows a second optical configuration of a sensor module comprised in a security system in accordance with one embodiment of the invention.

A further optical configuration of a sensor module comprised in a security system in accordance with another embodiment of the invention is illustrated in FIG. 5. Each laser sensor 10 comprises a VCSEL, which is the laser source 100 of the laser sensors 10. Laser light from two laser sensors 10 is focused on the target regions by two micro-lenses 41. A certain tilt angle between the laser sensors 10 ensures that the first laser sensor 10 measures the head region 401 and the second laser sensor 10 measures the chest region 402 of the human body. The micro-lenses 41 are integrated directly with the emitting window of the VCSELs. The distance between the optical window 44 and the VCSELs is significantly smaller than in the embodiment shown in FIG. 4.

Figure 6:
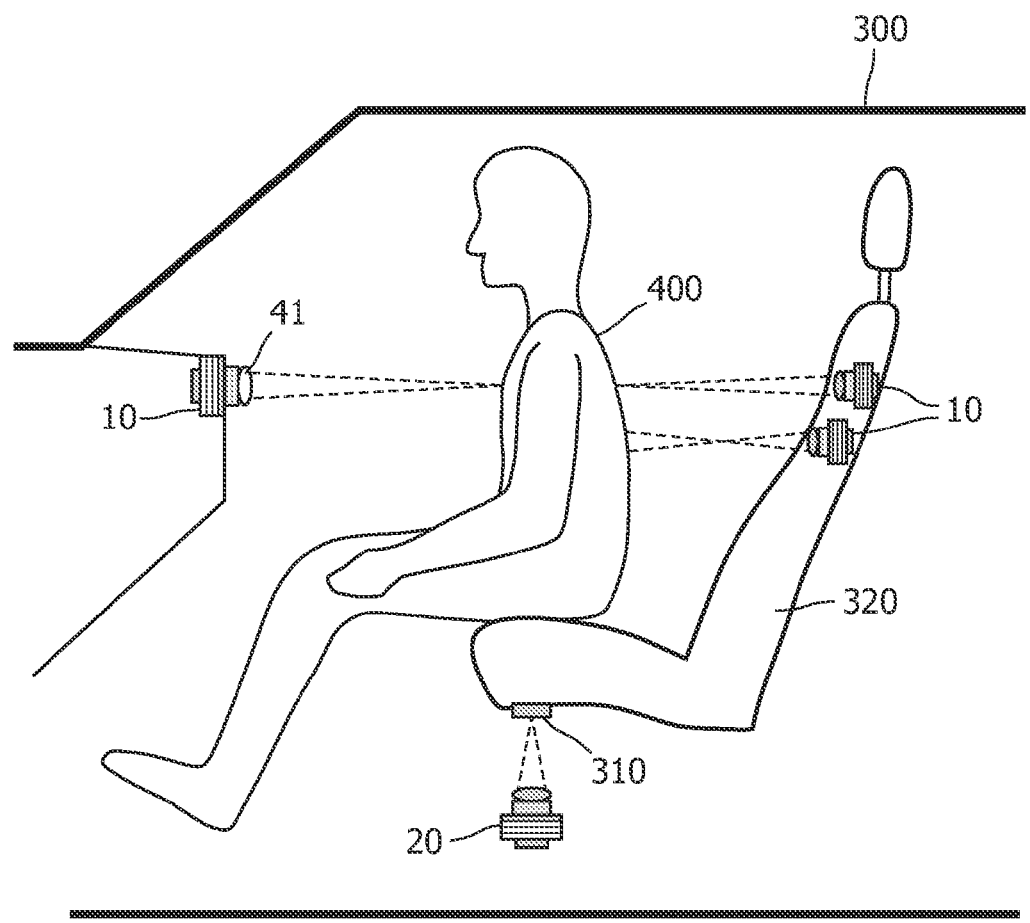
FIG. 6 shows another embodiment of the invention, using several groups of laser sensors.

FIG. 6 shows another embodiment in accordance with the invention. At least three sensor groups comprising one or more laser sensors 10 are employed at various positions in a vehicle 300 in order to characterize the kinematic data of the human body 400 before and during a front collision. Namely, sensor group A comprising at least one laser sensor 10 integrated in the cockpit of the vehicle 300 detects the closing speed of an occupant against the steering wheel (not shown) or the vehicle body; sensor group B comprising at least two laser sensors 10 integrated in the seat 320 of the vehicle 300 monitors the speed of the human being relative to the seat 320 in which the human body 400 is sitting (the distance from the seat to the vehicle body can be readily obtained either by the laser sensors 10 or by other types of displacement or distance sensors); and sensor group C, which is the object sensor 20 comprising one laser sensor 10, detects the vertical displacement of the seat base which is proportional to the weight of the human body, respectively. All measurement data generated by the different sensor groups are transmitted to an airbag computer (not shown). Dependent on the kinematic data of the human body 400 (e.g. one component of the momentum of the human body) determined by means of the airbag computer, one airbag or a plurality of airbags is activated.

Figure 7:
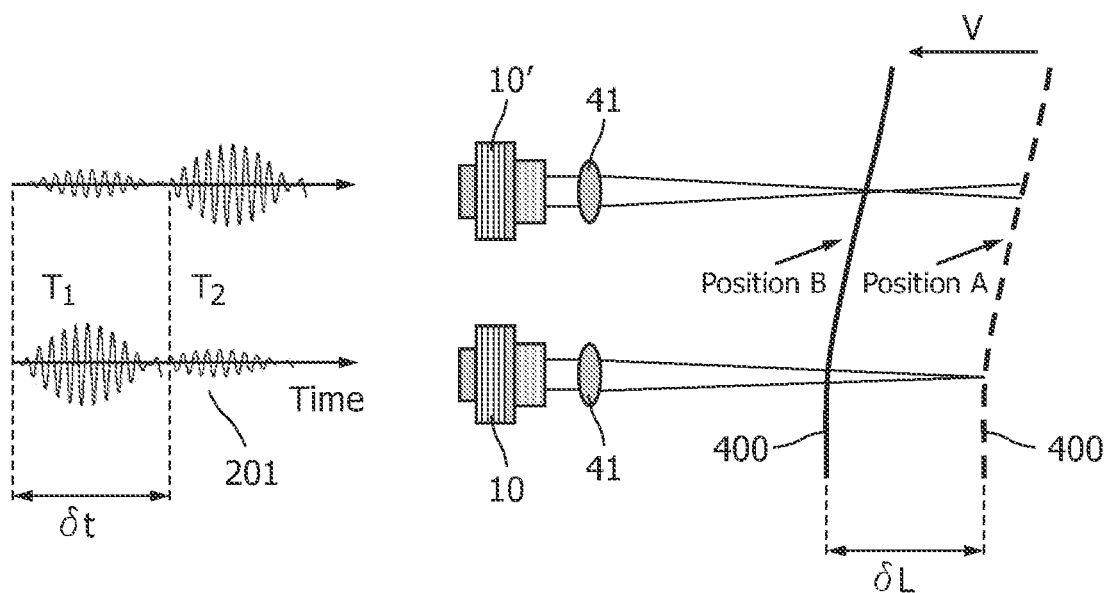
FIG. 7 illustrates the velocity measurement by means of the laser sensors according to the invention.

As is shown in FIG. 7, the velocity of the human body 400 relative to the vehicle or seat can be determined with high precision by means of two laser sensors 10, 10'. The laser light emitted by the laser sensors 10, 10' is focused on the human body 400 by means of optical elements 41. The lasers sensors may be mounted either in the occupant seats or in the steering wheel or front vehicle body. The focal length of the first laser sensor 10 and the second laser sensor 10' is set with a difference of δL. During severe front collisions, the human body 400 will move from position A to position B. At position A, a burst of photocurrent signals 201 (measurement data) will be generated by the first laser sensor 10 due to maximum optical feedback from the laser focus of the first laser sensor 10. Similarly, at position B, a burst of SMI signals 201 (measurement data) will be generated by the second laser sensor 10'. The time delay between the two SMI signal bursts is denoted as δt. Based on multi-foci laser sensors, the relative velocity of an occupant against the vehicle body, steering wheel or occupant seat is determined by δL/δt. Alternatively, the instantaneous velocity at position A and position B may be directly derived from the Doppler frequency of the measurement data generated by the laser sensors 10, 10' at the time of $T_1$ and $T_2$, respectively. Direct measurement of the velocities at time $T_1$ and $T_2$ may have the advantage that a faster response (activation of the airbag) is possible and the acceleration may be derived. Additional information with respect to the acceleration may allow improved control of the activation time of the airbag.

Figure 8:
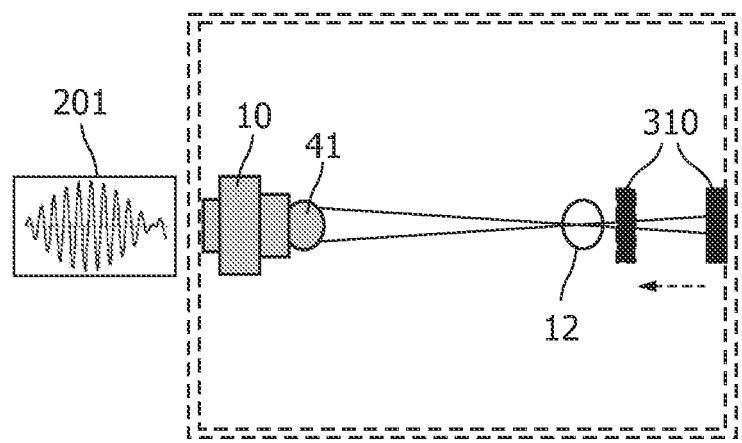
FIGS. 8 and 9 show two embodiments of side-impact sensor modules that can be integrated in a security system according to the invention.
Figure 9:
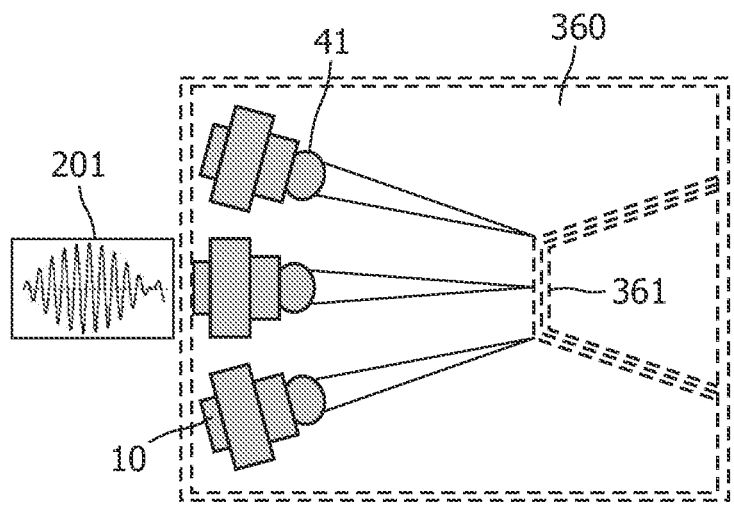

In another embodiment according to the invention, shown in FIG. 8, the security system comprises a side impact sensor module working with self-mixing interference. The side impact sensor module comprises one laser sensor 10 with a VCSEL used as a laser source and with a vertically integrated photodiode used as a detector, and a micro-lens 41 as well as a diffusively reflective surface 310 which introduces optical feedback to the VCSEL. The VCSEL and the reflective surface are mounted to each respective side of a vehicle door cavity. The reflective surface is located behind the VCSEL focus at a certain distance, for example, a few cm or at least one Rayleigh range. As illustrated in FIG. 8, the vehicle door is deformed during severe side collisions and the reflective surface 310 moves across the focal region 12 of the laser sensor 10. A large burst of the undulated photocurrent signals can be observed due to a change of the optical feedback strength. The deformation speed of the vehicle door is linearly proportional to the frequency of the undulated photocurrent signals 201. This measurement data is analyzed by an airbag computer (not shown), and a side airbag (not shown) is activated if the deformation speed of the vehicle door exceeds a defined threshold value. As low-cost, accurate and highly integrated laser devices, multiple VCSELs may be integrated in the side impact sensor module installed at various positions in the side door cavity so as to identify the locations of side collisions. Furthermore, the multiple VCSELs may detect deformation of the vehicle door indirectly as illustrated in FIG. 9. In the case of severe side collisions, the deformation of the vehicle door generates a pressure wave front 361 in the medium 360 (e.g. air) in the door cavity propagating towards the VCSELs. The pressure wave front 361 with an abrupt change in air density is equivalent to a virtual, reflective surface. As the pressure wave front 361 propagates through the focal regions of the VCSELs, a burst of the photocurrent signals 201 is observed. Again, speed and magnitude of the pressure wave are correlated with the frequency and amplitude of the corresponding undulated photocurrent signals 201. As a fast responding and non-contact side impact sensor module, multiple VCSEL-based laser sensors 10 with different angles of incidence can be employed to accommodate the complex shape of the pressure wave front and to evaluate the direction of the side impact.

Figure 10:
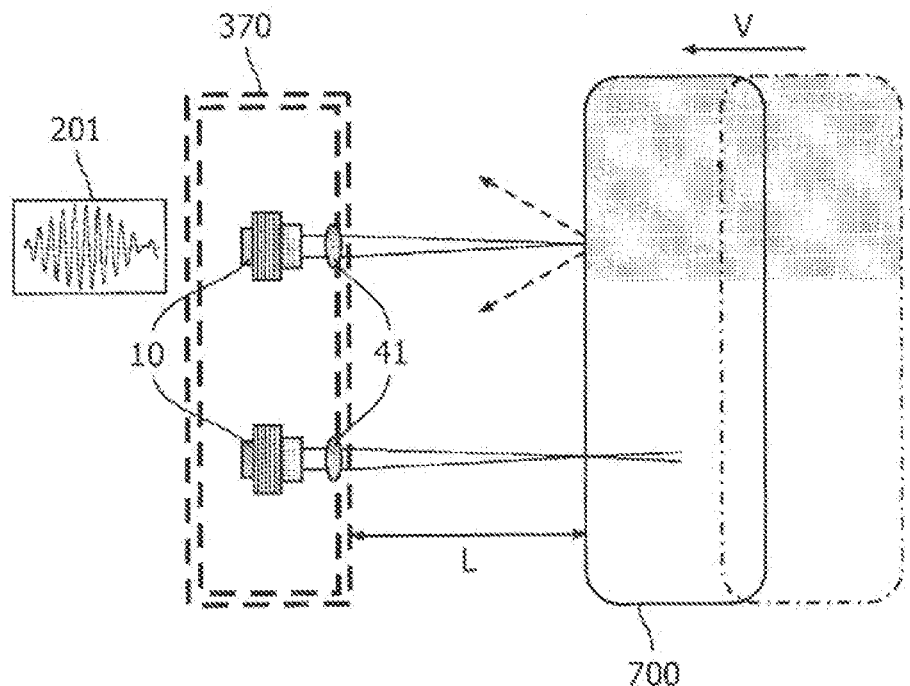
FIG. 10 shows parts of another embodiment according to the invention, using laser sensors as pre-crash side airbag sensors.

Another embodiment of the invention is shown in FIG. 10. A security system comprising laser sensors 10 is used as a pre-crash side airbag sensor. The laser radiation emitted by the laser sensors 10 is focused on a point or focal region which is located e.g. outside the vehicle door 370. The laser light is preferably emitted substantially perpendicularly to the surface of the vehicle door 370 in order to determine the velocity component, which is relevant to determine a crash. The distance between the focal point of the laser sensors 10 and the vehicle body is denoted as L, which defines the depth of a critical pre-crash region. A moving object 700 which enters the critical pre-crash region results in a burst of photocurrent signals 201 that are part of the measurement data transferred to an airbag computer (not shown) and generated by a photodiode which is integrated in the laser sensors 10. The frequency of the photocurrent signals 201 is proportional to the closing velocity of the moving object 700. The airbag computer determines the presence of a rapidly approaching moving object 700 at a distance which is much larger than the vehicle door cavity thickness. At a focal length (L) of 1 m of the laser sensors and a closing velocity (V) of 50 km/h of the moving object 700, the moving object 700 can be detected 72 ms before a real crash. Furthermore, the probability of a crash can be determined by means of the airbag computer. If the probability of a crash (which is dependent on the velocity of the moving object 700) exceeds a defined threshold value, a side airbag (not shown) is activated by means of the airbag computer. As compared with the current pressure or an acceleration rate-sensitive side airbag sensor, the huge lead time of pre-crash laser sensors 10 allows an earlier and better protection of a human body during side collisions. As a safety-related security system, several measures have to be taken for a most reliable employment of such a security system. First, an array of laser sensors 10 should be employed to monitor a large side collision zone, which is not necessarily limited to the vehicle doors (for example, regions adjacent to engine housing or trunk, in headlamp or rear signal lamp housings, etc). Secondly, the closing velocity of the moving object 700 can be directly derived from the Doppler frequency of photocurrent signals 201. Side airbags or other safety-related components will be activated only when the closing velocity V of an approaching target exceeds a pre-defined threshold value. Furthermore, as described in conjunction with FIG. 7, a second group of laser sensors 10 with different focal lengths may be employed to further improve the detection reliability. A photocurrent signal burst is observed first by sensor group A. After a time delay of approx. δL/V, sensor group B must observe the second SMI signal burst. If not, the side airbag will not be deployed. Furthermore, the side airbag may only be activated or deployed if two, three or more adjacent laser sensors 10 of one sensor group detect the moving object 700 in order to prevent that a small object such as e.g. a bird may deploy the side airbag. A security system comprising a pre-crash airbag sensor may be coupled to other pre-crash safety components (for example, active steering, alarming, seat automatic positioning) so as to minimize the damage caused by side collisions.

Figure 11:
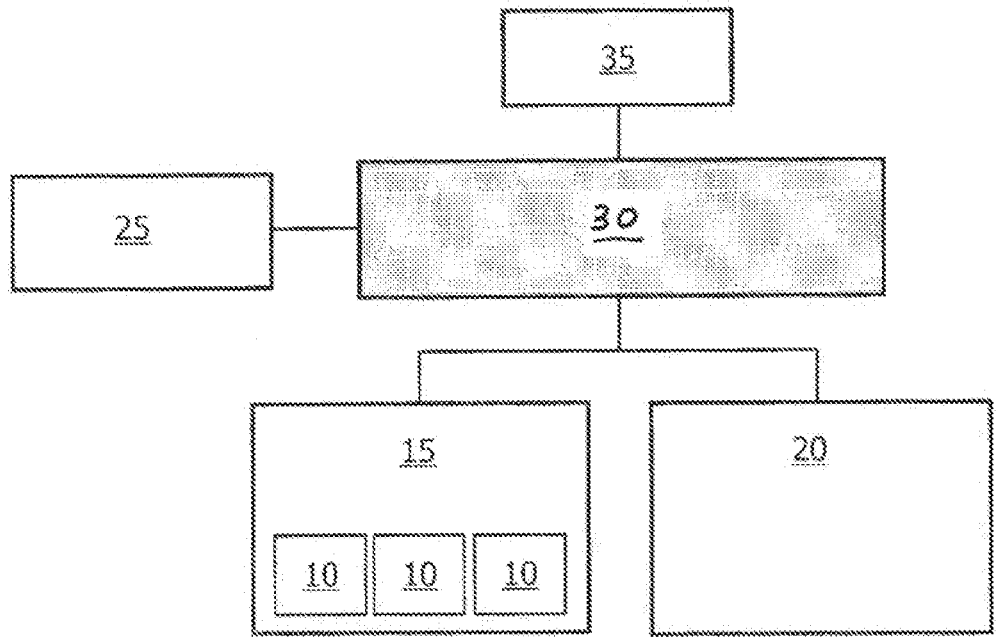
FIG. 11 shows diagrammatically a further embodiment of the invention.

FIG. 11 is a principal sketch of a security system according to the invention, comprising a sensor module 15 with three laser sensors 10, an object sensor 20 and an acceleration sensor 25. The measurement data provided by the sensor modules 15, 20, 25 is received by the control circuit 30, which is an airbag computer. The airbag computer performs a systematic assessment of the airbag trigger conditions, taking into account both vehicle and human body kinetics so as to precisely determine whether the airbag 35 will be deployed, when it will be inflated and what will be the optimal inflation force for the individual human body.

The present invention has been described with reference to particular embodiments and certain drawings, but this is not to be construed in a limiting sense, as the invention is limited only by the appended claims. Any reference signs in the claims shall not be construed as limiting the scope thereof. The drawings described are only schematic and non-limiting. In the drawings, the size of some of the elements may be exaggerated and not drawn to scale for illustrative purposes. Use of the verb "comprise" and its conjugations in the present description and claims does not exclude other elements or steps. Use of the indefinite or definite article when referring to a singular noun, e.g. "a" or "an", "the" includes a plural of this noun unless specifically stated otherwise.

Furthermore, the terms first, second, third and the like in the description and claims are used to distinguish between similar elements and not necessarily to describe a sequential or chronological order. It is to be understood that the terms so used are interchangeable under appropriate circumstances, and that the embodiments of the invention described hereinbefore are capable of operation in sequences other than those herein described or illustrated.

Moreover, the terms top, bottom, first, second and the like in the description and claims are used for descriptive purposes and not necessarily for describing relative positions. It is to be understood that the terms so used are interchangeable under appropriate circumstances and that the embodiments of the invention described hereinbefore are capable of operation in orientations other than those herein described or illustrated.

Other variations of the disclosed embodiments can be understood and effected by those skilled in the art in practicing the claimed invention, from a study of the drawings, the disclosure, and the appended claims.

The invention claimed is:

1. A security system comprising:
a sensor module (15) comprising at least one laser sensor (10) working with self-mixing interference, the laser sensor having a Rayleigh range;
at least one optical element for focusing light;
a control circuit (30) and security means;

wherein the sensor module (15) comprises means to generate first measurement data which are directly or indirectly related to at least one first velocity component of an object (400, 351, 700) relative to the sensor module (15), and wherein the control circuit (30) comprises means to receive the first measurement data generated by the sensor module (15) and to activate the security means in dependence upon the first measurement data received from the sensor module as soon as the first measurement data exceeds a defined first threshold value;

wherein the laser sensor (10) in combination with the at least one optical element has a focal region (12) between the optical element and the object, and the distance between the focal region (12) and the object is greater than one Rayleigh range.

2. The security system according to claim 1, wherein the control circuit (30) comprises means to determine the first velocity component of the object and to activate the security means as soon as the first velocity component of the object exceeds a predefined first velocity threshold value.

3. The security system according to claim 2, wherein the control circuit (30) further comprises means to determine a first distance between the sensor module (15) and the object.

4. The security system according to claim 3, wherein the control circuit (30) further comprises means to adjust the first velocity threshold value in dependence upon the first distance.

5. The security system according to claim 1, wherein the sensor module (15) comprises means to generate at least second measurement data which are directly or indirectly related to at least a second velocity component of the object relative to the sensor module (15) and/or at least a second distance between the sensor module (15) and the object, and wherein the control circuit (30) comprises means to activate security means in dependence upon the second measurement data received from the sensor module (15) as soon as the first measurement data exceeds the defined first threshold value and/or the second measurement data exceeds a defined second threshold value.

6. The security system according to claim 5, wherein the control circuit (30) comprises means to determine at least the second velocity component of the object and to activate the security means as soon as the first velocity component of the object exceeds a predefined first velocity threshold value and the second velocity component exceeds a predefined second velocity threshold value.

7. The security system according to claim 1, further comprising at least one object sensor (20) which comprises means to generate object data related to the weight of the object (400), wherein the control circuit (30) comprises means to receive the object data and to determine kinematic data of the object (400) based on the combination of first measurement data generated by the laser sensor (10) and the object data provided by the object sensor (20), and to activate the security means in dependence upon the kinematic data.

8. The security system according to claim 1, wherein the control circuit (30) is an airbag computer (350), the security means is at least one airbag (35), and the object is a human body.

9. The security system according to claim 8, wherein the sensor module (15) comprises means to generate first measurement data which are directly related to the first velocity component of the head region (401) of the human body and a first distance between the laser module (15) and the head region (401) of the human body, the sensor module (15) further comprising means to generate second measurement data which are directly related to a second velocity component of the chest region (402) of the human body and a second distance between the laser module (15) and the chest region (402) of the human body, and wherein the airbag computer comprises means to determine the first velocity component, the first distance, the second velocity component and the second distance and to activate the at least one airbag as soon as the first velocity component exceeds the first velocity threshold value and/or the second velocity component exceeds a second velocity threshold value.

10. The security system according to claim 9, wherein the airbag computer further comprises means to adjust the first velocity threshold value in dependence upon the first distance and/or to adjust the second velocity threshold value in dependence upon the second distance.

11. The security system according to claim 8, further comprising at least one object sensor (20) which comprises means to generate object data related to the weight of the object (400), wherein the airbag computer comprises means to receive the object data and to determine kinematic data of the object (400) based on the combination of first measurement data generated by the laser sensor (10) and the object data provided by the object sensor (20), and to activate the security means in dependence upon the kinematic data.

12. The security system according to claim 8, further comprising a side impact sensor module which comprises at least one laser sensor (10) working with self-mixing interference, wherein the side impact sensor module comprises means to generate third measurement data which are related to the velocity of a moving object (700), the moving object (700) being outside a vehicle in which the security system is mounted, and wherein the airbag computer (350) comprises means to activate the at least one airbag (35) and/or an additional side airbag as soon as the third measurement data exceeds a defined third threshold value.

13. The security system according to claim 8, further comprising an acceleration sensor (25) which is integrated in a vehicle, wherein the acceleration sensor (25) comprises means to generate acceleration data which are related to the acceleration of the vehicle, and wherein the airbag computer comprises means to activate the at least one airbag (35) as soon as the first measurement data exceeds the first threshold value and/or the acceleration data exceeds a defined acceleration threshold value.

14. A method of driving a security system comprising a sensor module (15), wherein the sensor module (15) comprises at least one laser sensor (10) working with self-mixing interference, the security system further comprising at least one optical element for focusing light, a control circuit (30) and security means (35), the laser sensor (10) comprising at least one laser (100) having a laser cavity and at least one detector (200), and wherein the method comprises the steps of:

generating laser light (7) in the laser cavity, employing the optical element to focus the laser light (7) to a focal region between the optical element and an object, and the distance between the focal region and the object is greater than one Rayleigh range, illuminating the object (400, 361, 700) with the laser light (7), reflecting a part of the laser light (7) by the object (400, 361, 700), interfering of the reflected laser light (8) and the optical wave in the laser cavity, sensing the interference of the reflected laser light (8) and the optical wave in the laser cavity by means of the detector (200), generating first measurement data which are directly or indirectly related to at least a first velocity component of the object (400, 361, 700) by means of the detector (200), receiving the first measurement data by means of the control circuit (30), evaluating the received first measurement data with a defined threshold value by means of the control circuit (30), and activating the security means (35) as soon as the first measurement data exceeds a defined first threshold value.

\* \* \* \* \*